United States Patent
Karkov et al.

(10) Patent No.: US 10,824,173 B2
(45) Date of Patent: Nov. 3, 2020

(54) METHOD FOR OPERATING AT LEAST ONE PUMP ASSEMBLY OF A MULTITUDE OF PUMP ASSEMBLIES

(71) Applicant: GRUNDFOS HOLDING A/S, Bjerringbro (DK)

(72) Inventors: Jørgen Karkov, Struer (DK); Kris Nørskov, Brabrand (DK); Carsten Skovmose Kallesøe, Viborg (DK)

(73) Assignee: GRUNDFOS HOLDING A/S, Bjerringbro (DK)

( * ) Notice: Subject to any disclaimer, the term of this patent is extended or adjusted under 35 U.S.C. 154(b) by 161 days.

(21) Appl. No.: 15/855,271

(22) Filed: Dec. 27, 2017

(65) Prior Publication Data

US 2018/0181145 A1    Jun. 28, 2018

(30) Foreign Application Priority Data

Dec. 28, 2016 (EP) .................................. 16207135

(51) Int. Cl.
*G05D 7/06* (2006.01)
*F04D 15/00* (2006.01)
(Continued)

(52) U.S. Cl.
CPC ......... *G05D 7/0617* (2013.01); *F04B 49/065* (2013.01); *F04D 13/12* (2013.01);
(Continued)

(58) Field of Classification Search
CPC .... F04B 2205/07; F04B 49/065; F04D 13/12; F04D 15/0088; F05D 2270/20; G05D 7/0617; H04L 67/12
See application file for complete search history.

(56) References Cited

U.S. PATENT DOCUMENTS

2002/0029130 A1* 3/2002 Eryurek .................. G01F 1/363
702/183
2009/0204245 A1* 8/2009 Sustaeta ............... G05B 13/024
700/99
(Continued)

FOREIGN PATENT DOCUMENTS

CN        202 28 4531 U     6/2012
EP        2 151 578 A1      2/2010
(Continued)

OTHER PUBLICATIONS

Ján Drgoňa, et al., "Approximate model predictive building control via machine learning", Applied Energy, v. 218, pp. 199-216, May 15, 2018 (Available online Mar. 9, 2018, accessed from <<https://doi.org/10.1016/j.apenergy.2018.02.156>> on Oct. 29, 2019). (Year: 2019).*

Primary Examiner — Michael J Huntley
(74) Attorney, Agent, or Firm — McGlew and Tuttle, P.C.

(57) ABSTRACT

The method serves for operating at least one pump assembly (1, 1a, 5) of a multitude of pump assemblies (1, 1a, 5) which each comprise a programmable electronic motor (4, 4a, 6) control for individual pumps or groups or pumps, and which are at least temporarily data-connected to a server (8) via a network, with which data, in particular parameters and/or operating data of the multitude of pump assemblies (1, 1a, 5) is transferred via the network to a server (8) and is stored there in a data base. The stored data is processed according to defined typically statistical computation rules, whereupon the at least one pump assembly is then adapted in its programming via the network, on the basis of the processed data.

11 Claims, 4 Drawing Sheets

(51) Int. Cl.
*F04D 13/12* (2006.01)
*F04B 49/06* (2006.01)
*H04L 29/08* (2006.01)

(52) U.S. Cl.
CPC ...... *F04D 15/0088* (2013.01); *F04B 2205/07* (2013.01); *F05D 2270/20* (2013.01); *H04L 67/12* (2013.01)

(56) References Cited

U.S. PATENT DOCUMENTS

| | | | | |
|---|---|---|---|---|
| 2011/0135515 A1* | 6/2011 | Jensen | ................... | F24D 11/003 |
| | | | | 417/410.1 |
| 2012/0101745 A1* | 4/2012 | Kohno | ................... | F02D 41/18 |
| | | | | 702/45 |
| 2013/0243614 A1* | 9/2013 | Moon | ................... | F17D 3/00 |
| | | | | 417/63 |
| 2014/0229023 A1* | 8/2014 | Bomholt | ................ | F04D 15/00 |
| | | | | 700/282 |
| 2015/0095100 A1* | 4/2015 | Vittal | ................... | F04D 13/10 |
| | | | | 705/7.28 |
| 2015/0308627 A1* | 10/2015 | Hoskins | ................... | E03B 7/00 |
| | | | | 702/45 |
| 2015/0316919 A1* | 11/2015 | Junkers | ................ | F15B 19/002 |
| | | | | 700/275 |

FOREIGN PATENT DOCUMENTS

| | | |
|---|---|---|
| WO | 2013/041616 A1 | 3/2013 |
| WO | 2013/149281 A1 | 10/2013 |

* cited by examiner

METHOD FOR OPERATING AT LEAST ONE PUMP ASSEMBLY OF A MULTITUDE OF PUMP ASSEMBLIES

CROSS REFERENCE TO RELATED APPLICATIONS

This application claims the benefit of priority under 35 U.S.C. § 119 of European Application 16 207 135.1, filed Dec. 28, 2016, the entire contents of which are incorporated herein by reference

FIELD OF THE INVENTION

The invention relates to a method for operating at least one pump assembly of a multitude of pump assemblies which each comprise a programmable electronic motor control for individual pumps or groups of pumps and which are at least temporarily data-connected to a server via a network. The invention moreover relates to a programming method in the context of operating a pump assembly, as well as to a fluid pump system with a multitude of pump assemblies with a programmable electronic motor control.

BACKGROUND OF THE INVENTION

Pump assemblies with a programmable electronic motor control, whose speed is variable in wide ranges, are nowadays applied as standard in numerous applications, be they in wastewater technology, in service water technology, in heating and air-conditioning technology and the like. The variance of the setting possibilities often renders it difficult to energetically operate the pump assembly in a favourable manner, which is to say operate it at energetically optimised operating points. Thus in practise, it is often the case that the operation of the pump assemblies could be effected in an energetically more favourable manner, despite the application of this sophisticated technology. This not only leads to increased operating costs, but at high speeds can also lead to noise emissions, to premature wearing and other problems.

Added to this is the fact that the hydraulic dimensioning of such programmable pump assemblies, which is to say ones which are speed-controllable, is extremely complicated, so that on the part of the manufacturer, if at all, only very few pump assemblies are dimensioned, which is why the characteristic curves forming the basis of the pump assemblies can be inaccurate. This can also lead to the pump assembly not being operated in the energetically most favourable region.

From CN 202284531 U, it is counted as belonging to the state of the art, to transfer the operating data of a pump assembly to a cloud-based data base and, on the basis of the stored data, to examine whether the pump assembly runs in the designated manner. It is moreover counted as belonging to the state of the art, to determine the parameters of the pump assembly on the basis of the data stored in the data base and in the case of deviations, to replace these with newly determined parameters on the pump assembly side.

On the part of the applicant, a cloud-based data base system, with which operating data of pump assemblies is uploaded worldwide into the data base, is known under Grundfos GRM. This data is then available to the relevant service technician, so that on the basis of the course of the data, on the one hand he can recognise deviations from designated operation and on the other hand tendencies with regard to possible wearing parts. Thus for example, one can estimate when seals are to be exchanged or other service work is to be done, on the basis of the number of operating hours which is stored there.

SUMMARY OF THE INVENTION

Against this background, it is the object of the present invention, to provide a method for operating at least one pump assembly of a multitude of pump assemblies, with which the operation of the pump assembly is improved, in particular can be operated in a manner which is energetically favourable, low in wear, adapted to the operating conditions or improved in another manner. Furthermore, a fluid pump system with which such a method can be carried out is also to be provided.

The part of this object which concerns the method is achieved by a method for operating at least one pump assembly of a multitude of pump assemblies. Further a method for programming such a programmable, electromotorically driven pump assembly is specified. Additionally, a fluid pump system for carrying out this method is provided.

The method according to the invention, for operating at least one pump assembly of a multitude of pump assemblies which each comprise a programmable electronic motor control for individual or groups of pumps and which are at least temporarily connected to a server via a data network, with which data, in particular parameters and/or operating data of the multitude of pump assemblies is transferred via the network to a server and is stored there in a data base, envisages the stored data being processed according to defined computation rules, whereupon the at least one pump assembly is then adapted in its programming via the network, on the basis of the processed data.

The basic concept of the method according to the invention, is to evaluate a multitude of operating and setting data of pump assemblies in operation, by way of the acquisition of this data by a data base and by way of statistical algorithms, and, as the case may be, to adapt the individual pump assembly in its programming on the basis of this data, if after the evaluation, it should be ascertained that this for example is not operated in the energetically most favourable region. The method according to the invention however is not limited to adapting the operating point of the pump assembly as the case may be, but for example also permits the parameters of the mathematic models which are stored in the electronic motor controls and which define the linking of the electrical data of the motor to the hydraulic data of the pump, to be adapted. Incorrectly operating sensors or other components can also be determined on the basis of the data stored on the server side, by way of ascertaining that the data transferred by the pump assembly is not consistent. Finally, the method according to the invention permits the pump curves in the electronic control of a pump assembly and which are defined at the factory, to be improved with regard to their consistency with the actual behaviour of the pump assembly. Advantageously, not only is the data transferred to the server stored, but also the result of the processing of the transferred data.

The data transmission between the pump assemblies and the cloud-based data base is preferably effected in a wireless manner, but however can also be wire-connected.

A pump assembly in the context of the present invention is to be understood as a pump, for example a centrifugal pump, with an electrical drive motor and with an electronic motor control which is connected ahead of the motor. Thereby, the electronic motor control is typically part of power converter/frequency converter, with which the speed of the pump can be set in wide ranges. A pump assembly in the context of the present invention can also be a pump assembly group, with which several pump assemblies are assigned to a common control.

According to an advantageous further development of the method according to the invention, the data of pump assemblies of different types is acquired in the data base and is grouped for the purpose of processing. Thereby, it is advantageous if, with regard to the data base, it is the case of a relational data base, which is to say the grouping per se does not necessarily have to be effected on the data base side, but advantageously not until evaluating the data base. With so-called booster pumps for example, with which it is typically the case of a group of several pump assembles, ahead of which a common electronic programmable control is connected, it can make sense on the one hand to consider this group of pump assemblies quasi as one pump assembly, but on the other hand to also consider the individual pump assemblies of such a booster pump which each themselves have a programmable electronic motor control, wherein this consideration depends on which statistical evaluation is to be carried out. Of course, such different groups of data of pump assembles are advantageously grouped beforehand in the data base, the data of which not being able to be brought into any meaningful relationship with one another in any case.

According to an advantageous further development of the method according to the invention, with a first group of pump assemblies, with which operating data is determined by way of electrical variables of the drive as well as by way of at least one detected hydraulic variable, this data is compared to the operating data of a second group of pump assembles of the same type, with which the operating data is only acquired by way of electrical variables of the drive, and on the server side, the operating data of the second group of pump assemblies is adapted in its programming on the basis of the detected hydraulic variables of the first pump. This further development of the method according to the invention has the advantage that the pump assemblies which have no sensor devices for detecting a hydraulic valuable nor are connected to such can also be quasi operated as if they had such. Even if this can only be realised within certain limits, at least the accuracy of the operating point detection and thus also the control of the pump assembly can be made significantly more precise with this, and this being the case without the application of hydraulic sensor means.

According to a preferred variant of the method according to the invention, data, in particular operating data of pump assemblies of the same type is statistically evaluated, and at least one pump assembly is then adapted in its programming, if it has a predefined deviation from the evaluated data. This evaluation with regard to the data base is preferably effected by way of an external server which is implemented with regard to software or can be present with regard to hardware, be it in an external computation centre or a computation centre at the factory side. The method according to the invention can thereby also be advantageously used to adapt the parameters/operating data of pump assemblies which are equipped differently with regard to their sensor means. Thus with pump assemblies which have no flow sensor, it is counted as belonging to the state of the art to determine the flow rate by way of electrical data of the motor control. If now, with the method according to the invention, one compares pump assemblies of the same type and which are in operation, of which some are equipped with a flow sensor and others not, thus the operating points of a pump assembly which has no flow sensor with the same operating points of pump assemblies whose flow rate is determined by way of a sensor, then the pump assembly without the sensor can be improved in its operating point detection by way of a suitable adaptation of the programming of this pump assembly.

Advantageously, pump parameters, in particular pump curves of a multitude of pump assemblies or pump assembly groups are statistically evaluated, for example by way of mean formation and determining the standard deviation, by the method according to the invention and on the basis of the operating data of pump assemblies of the same type or of pump assembly groups of the same type, said data stored in the data base, and the determined mean (average) data is used for programming a pump assembly or a pump assembly group. In this manner, the hydraulic values which are typically computed on the basis of electrical values of the motor can be significantly adapted to the actual conditions, by which means the operating points which are moved to by the pump assembly lie closer to the actual hydraulic operating points. The pump control can also be improved by way of this, and in particular an energetically more favourable operation of the pump assembly is possible by way of this.

On account of the large number of pump assemblies which deliver data to the central server via the network, groupings of pump assemblies which differ from one another for example only with regard to the details can be formed, in order thus on the one hand to determine what effects these changes have in practise and on the other hand to further optimise the applied computation models within the controls. Thus for example it has been found that the mathematical pump model which is applied with the pumps of the same type but which differ in the arrangement of the flow sensor—with one group the flow sensor is arranged in the suction branch and with the other group is arranged in the delivery branch—can be different/improved. Even such small differences can thus lead to changes of the parameters of the pump model.

In an analogous manner and according to a further development of the method according to the invention, the data of an operating condition of a pump assembly or of a pump assembly group can be compared to data from the data base, of operating conditions which are the same with regard to the hydraulic situation, of pump assemblies of the same type or pump assembly groups of the same type, wherein if an in particular energetically more favourable operating condition is determined by the comparison, the pump assembly or the pump assembly groups is/are programmed for reaching this more favourable operating condition. It is to be understood that in a multitude of application cases, a comparison concerning energetically more favourable operating conditions is effected, in order to achieve this condition also with other pump assemblies or pump assembly groups. The method according to the invention however is not restricted to this, and one can also compare and adapt according to other criteria, for example running smoothness, low wearing and the like. With so-called booster pumps consisting of a group of pump assemblies which are connected in parallel and which are connected and disconnected in a load-dependent manner, this method is particularly suitable for determining the energetic most favourable switching points and to program in these switching points for connecting and disconnecting the pump assemblies of the group.

The method according to the invention entails a programming method, which with a programmable, electromotorically driven pump assembly or a pump assembly group, compares data of the pump assembly or of the pump assembly group with data groups, stored in the data base, of programmable, electromotorically driven pump assemblies of the same type or pump assembly groups of the same type, whilst using a cloud-based data base containing operating and/or programming data of pump assemblies of the same type and/or pump assembly groups of the same type and are in operation, and adapts the programming of the pump assembly or of the pump assembly group on determining a predefined deviation. This procedure can be effected automatically, for example in certain time intervals, but it can be activated manually in a program-assisted manner or take its course in a fully automatic manner. The result of the evaluation of the parameters and/or operating data can itself be stored in the data base and e.g. be interactively used in a future evaluation.

On the other hand, according to the invention, a faulty pump assembly can be identified on the basis of its data due to the large number of data of pump assemblies. In the case of a defect sensor for example or of a fault in the control electronics of the pump assembly, at the server side such errors can be identified preferably in an automated manner and new control data computed. This data can then be taken into account in the programming of the pump assembly such that the pump assembly (given a sensor defect) where possible operates in less sensitive regions, by which means the error, although not being able to be eliminated, however at a minimum, an improved operation can be achieved whilst taking into account the faulty condition.

A fluid pump system which comprises a multitude of pump assemblies having a programmable electronic motor control for individual or groups of pump assemblies and being at least temporarily data-connected via a network to a server containing a data base for storing parameters and/or operating data of the pump assemblies, and which further comprises a data processing device designed to evaluate data transferred from the pump assemblies, according to predefined rules, typically statistical algorithms and to adapt at least an individual pump assembly in its programming, on the basis of the evaluated data, is necessary for carrying out the method according to the invention. This adaptation is preferably effected in an automatic manner, be it after installation of the pump assembly or according to fixed rules with regard to time and values. The fluid pump system can thereby be advantageously based on already existing pump assemblies (for example Grundfos GRM) which are acquired by to a data base, so that a statistical evaluation on the basis of a very large data quantity is ensured from the very beginning. The multitude of pump assemblies and pump assembly groups, which have already been in operation for years is therefore advantageously incorporated into the fluid pump system according to the invention, in order with this, to suitably adapt individual pump assemblies or pump assembly groups with regard to their programming, preferably those which are newly installed or which deviate from the determined values to a particularly large extent. The evaluation of the fluid pump system according to the invention is advantageously effected accordingly to statistical rules, for example mean formation and the determining of the standard deviation and specifically for the adaptation of the programming as well as for examining the consistency of the determined values. Fluid pump systems in the context of the present invention are to be understood as a system of a multitude of pump assemblies which with regard to their operating data/parameters/setting data are connected to the preferably cloud-based data base. A hydraulic or electrical connection of the pump assemblies is not necessary for this, but it can also exist in part-regions.

The fluid pump system is advantageously connected to a network which is internet based, so that pump assemblies and pump assembly groups, with regard to the data base can be effectively connected worldwide in an inexpensive manner. For this, the pump assemblies or the pump assembly groups advantageously comprise a web server, via which they are directly connected to the internet, or a LAN, preferably WLAN subassembly, via which they can be connected to a local network which for its part is then connected to the internet.

The method according to the invention is thereby advantageously not only in the position, on the basis of a data base, of adapting the programming of a certain pump assembly or of a pump assembly group on the basis of the acquired and statistically evaluated data of pump assemblies of the same type or pump assembly groups of the same type, but also of determining that a certain pump assembly is wrongly dimensioned, which is to say cannot fulfil the operational demands or however is over-dimensioned to such an extent that an energetic optimisation of the operating point cannot be effected even to a minimum extent. In such a case, a suitable marker can be placed in the programming of the pump assembly, and this marker is either regularly enquired or acquired on the part of the data base, or however on location produces a signal at the pump assembly, and this signal indicates this to the operator during service work or the like.

It is particularly advantageous if the fluid pump system according to the invention comprises a first group of pump assemblies which is provided in each case with at least one sensor for detecting a hydraulic variable, for example a flow rate and whose operating data is determined by way of electrical variables of the drive as well as at least one hydraulic variable detected by sensor, and this fluid pump system comprises a second group of pump assemblies of the same type whose operating data is determined by way of electrical variables of the drive, wherein on the server side the operating data of the second group of pump assemblies is adapted with regard to the programming on the basis of the detected hydraulic data of the first group. With the fluid pump system according to the invention, it is therefore possible by way of adapting the programming, to configure the pump assemblies of the second group which are of the same type, such that the adapted and numerically determined operating points lie significantly closer to the actual hydraulic operating points than previously, without a separate detection of these operating points by way of sensor being necessary. In an analogous manner, not only can this be effected with regard to the detection of the flow rate, but alternatively or additionally also with regard to detecting the pressure.

The invention is hereinafter explained in more detail by way of embodiment examples which are represented in the drawing. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
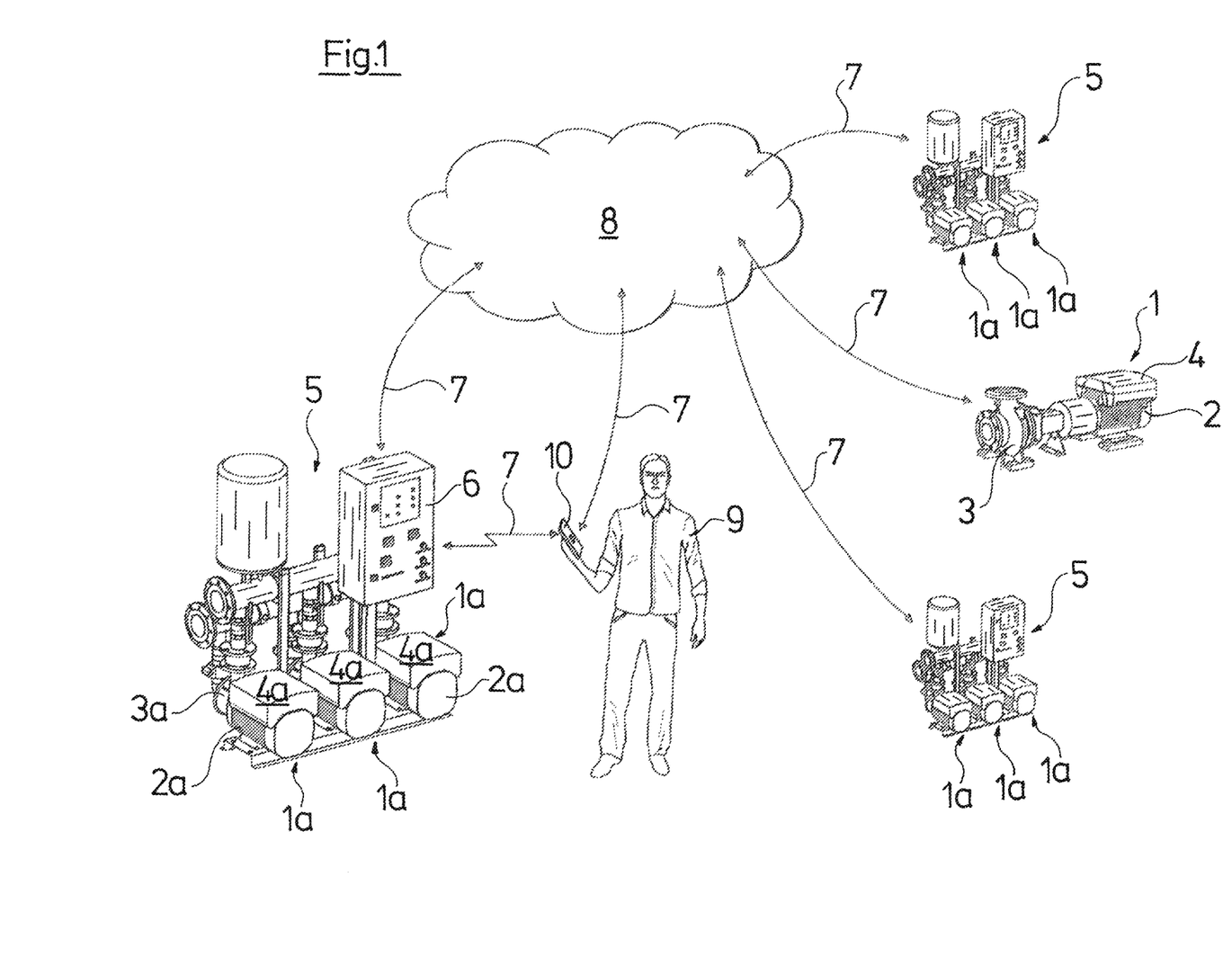
FIG. 1 is a greatly simplified representation, the linking of a multitude of pump assemblies, by way of a data base.

Referring to the drawings, the fluid pump system which is symbolically represented in FIG. 1 comprises a pump assembly 1 with an electric motor 2 driving a centrifugal pump 3 and comprising an electronic motor control 4 which is part of an electronic frequency converter activating the electric motor 3. The electronic motor control 4 is programmable.

The fluid pump system which is represented in FIG. 1 comprises three pump assembly groups 5. Each pump assembly group 5 consist of three pump assemblies 1a, each driven by an electric motor 2a driving the centrifugal pump 3a. There, an electric motor control 4a which is programmable is also assigned to the electric motors 2a in each case, to which motor control a central electronic control 6 which is likewise programmable is superordinate. The centrifugal pumps 3a are hydraulically connected in parallel and the pump assemblies 1a are connected or disconnected by the electronic control 6 depending on the power demand, so that the pump assembly group 5 in the system practically forms one pump assembly, as is usual with such booster pumps.

The pump assemblies 1 and 1a as well as the pump assemblies groups 5 and which are represented in FIG. 1 are specified here only by way of example, and in practise such a fluid pump system consists of thousands of pump assemblies and pump assembly groups, said assemblies and groups being of the same type, but can also be of a different type.

The pump assembly 1 as well as the pump assembly groups 5 are wirelessly connected to a network, as indicated by the data connection arrows 7. The connection to a cloud-based data base is effected by way of the internet, by which means pumps throughout the world have access to this data base. The data base forms part of a server 8 which can either be software-implemented or is formed by one or more computers with a suitable read-only memory, which are specifically provided for this purpose and on which a data base program runs. In this context, an existing data base of the applicant, the Grundfos Hydrobooster MPC is referred to, wherein this acquires the data of the pump assemblies which are connected thereto and its data can be retrieved by an operating person 9, for example by way of a smartphone 10, on which a suitable software application runs. The smartphone 10 is also provided for direct communication with the electronic control 6, which is to say is provided for and is suitable, for programming and for setting the control.

The cloud-based data base, thus the server 8, can be realised for example by a platform which is known under the trademark Azure®, from the company Microsoft and which is capable of receiving data from different pump assemblies 1, 1a and pump assembly groups 5, processing this data and as the case may be, after the processing, of sending it to a pump assembly 1, 1a for the purpose of programming.

The data which is transferred to the server 8 can be current operating data, such as motor current, motor voltage, speed, measured flow rate, calculated flow rate, measured differential pressure, calculated differential pressure, operating time, etc., but also data which does not change, such as for example the serial number of the pump assembly, the number and serial number of the sensors, the length and diameter of the connected conduits, locations of the facility and the like. The data base of the server 8 thus comprises a multitude of different data of different pump assemblies 1, 1a and pump assembly groups 5.

Figure 2:
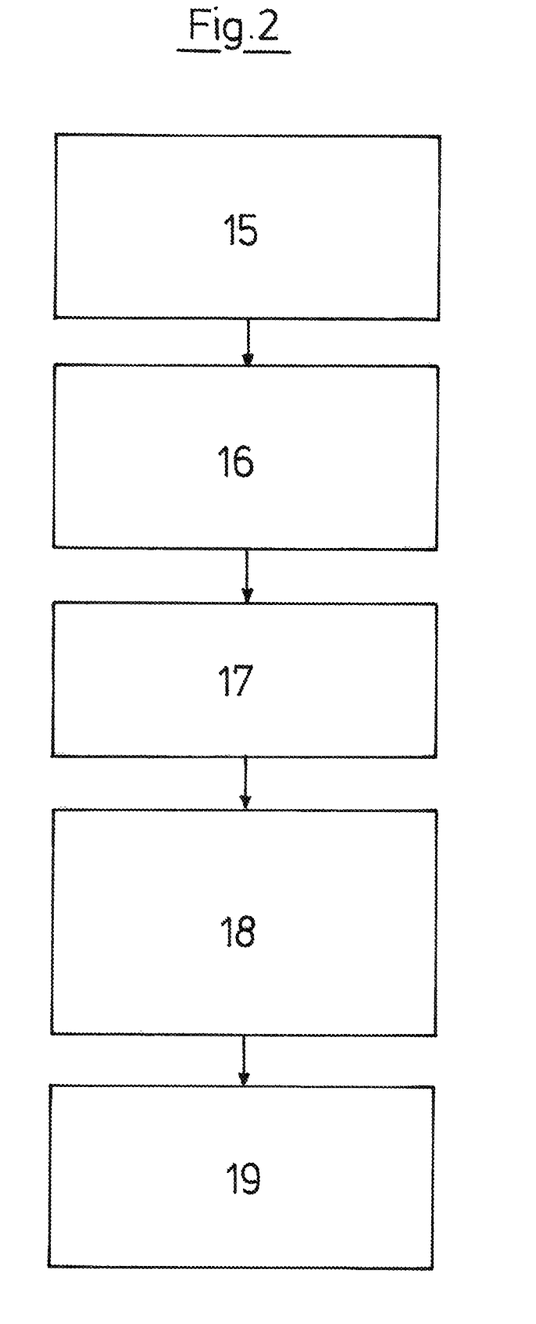
FIG. 2 is a flow diagram, from the detection of pump data up to the reprogramming of a pump assembly.

On the server side, the processing of the data is effected in a first step 15, in which the data sets of the individual pump assemblies are received. In a step 16, the data which is received from the different pump assemblies and pump assembly groups is assigned, and specifically in groups according to pump types. Thus for example there is a pump type which comprises booster pumps, which is to say pump assembly groups 5 consisting of several individual assemblies 1a which however are activated and programmed by a common electronic control 6. The multi-stage pumps for example form a further group, and another group in turn is assigned to the heating circulation pumps. Thereby, the groups do not necessarily need to be grouped according to the aforementioned manner, and such a grouping is effected as would appear most useful with regard to the evaluation. Thus for example the pump assembly groups 5 can be assigned to one data group, whereas their pump assemblies 1a can be assigned to another data group. Thereby, it is useful to bring together that data of the pump assemblies which is also to be used at a later stage for a statistical evaluation or for a comparison.

The respective data sets are then examined with regard to consistency in step 17, wherein a further examination as to whether the transferred operating data lies within a previously determined average tolerance band is effected. Data sets which exceed this tolerance band are discarded. In step 17, the data which is assigned to a group of pump assemblies is normalised, which is so say further processed such that pump assemblies of the same type but of a different construction size can be compared to one another.

The data transferred from the pump assemblies, in step 18 is then processed with the help of statistical methods and/or mathematical pump models, and the data which has been revised with regard to the data base inasmuch as this is concerned, in step 19 is transferred to a pump assembly 1, 1a or to a pump assembly group 5, at which the existing data is replaced by this processed data.

With the assignment of the data sets to pump groups, these data sets do not necessarily need to be assigned to only one group, but the formation of sub-groups is also conceivable. It is also possible to form the pump groups such that multiple overlapping are envisaged. Thus for example pump assemblies 1, 1a or pump assembly groups 5 which for example comprise a wearing part of the same type, for example a shaft seal, can be assigned to one group. On the other hand their assignment according to the delivered medium is also conceivable.

As to how such a grouping can look is explained hereinafter:

Table A includes multi-stage pump assemblies of the CR construction series whose serial number is acquired, whose field of application is acquired and with which the time between consecutive maintenance intervals is acquired. Moreover, with part of these pump assemblies, the delivery rate is detected by sensor, and this is stored in the table as data pairs (point in time, flow rate) of the point in time of the measurement and the magnitude of the flow rate.

TABLE A

| serial number | name of the pump | field of application | time between consecutive maintenance intervals (hours) | measured delivery rate (point in time l/hour) |
|---|---|---|---|---|
| 18495 | CR6 | industry | 4310 | 10:00, 1990<br>11:00, 1895<br>12:00, 1995 |
| 12112 | CR6 | industry | 2950 | 13:00, 2210<br>14:00, 2190<br>15:00, 2220 |
| 13180 | CR6 | industry | 3512 | no data |
| 7514 | CR6 | home | 1620 | 08:15, 1900<br>08:30, 1910<br>08:45, 1902 |
| 10712 | CR6 | industry | 4140 | 15:00, 1850<br>16:00, 2209<br>17:00, 2300 |
| 8212 | CR6 | home | 1770 | no data |

As the following table B shows, multi-stage centrifugal pump assemblies of the CR construction series are also specified there, with which the serial number is specified, as well as the type of the shaft seal, the expected service life of the seal and the delivered medium.

TABLE B

| serial number | name of the pump | type of shaft seal | expected service life of the seal (hours) | delivered medium |
|---|---|---|---|---|
| 1255 | CR5 | Typ P | 12050 | water |
| 1421 | CR5 | Typ P | 1800 | water |
| 17643 | CR6 | Typ O | 600 | glycol |
| 13210 | CR4 | Typ O | 800 | glycol |
| 8212 | CR5 | Typ P | 9100 | water |
| 1975 | CR4 | Typ O | 2100 | oil |

As the two tables A and B which each represent a group illustrate, a sorting according to different criteria can be effected.

Finally, the following Table C shows heating circulation pump assemblies of the type series Alpha 1, Alpha 2 and Alpha 3, each with their serial number, the type of their regulation, the current differential pressure at a given point in time, and the measured delivery rate at a given point in time.

TABLE C

| serial number | name of the pump | use | type of regulation | differential pressure (point in time, m) | measured delivery rate (point in time, l/hour) |
|---|---|---|---|---|---|
| 1534 | Alpha 1 | heating | proportional | 12:00, 3.2<br>12:30, 3.6<br>13:00, 4.0 | 12:00, 300<br>12:30, 305<br>13:00, 320 |
| 8422 | Alpha 2 | heating | proportional | 12:00, 4.1<br>12:30, 4.1<br>13:00, 4.1 | 12:00, 360<br>12:30, 360<br>13:00, 360 |
| 21987 | Alpha 1 | heating | constant pressure | 04:27, 2.9<br>04:28, 2.8<br>04:29, 2.9 | 04:27, 200<br>04:28, 201<br>04:29, 199 |
| 77865 | Alpha 1 | heating | proportional | 06:00, 3.3<br>12:00, 3.3<br>18:00, 3.5 | 06:00, 267<br>12:00, 267<br>18:00, 271 |
| 5423 | Alpha 3 | heating | constant pressure | 22:10, 3.6<br>22:30, 3.6<br>22:55, 3.7 | 22:10, 295<br>22:30, 291<br>22:55, 298 |
| 53142 | Alpha 1 | heating | constant pressure | 08:00, 4.8<br>09:00, 4.7<br>10:00, 4.7 | 08:00, 1477<br>09:00, 1600<br>10:00, 1755 |

The grouping is effected in method step 16.

Figure 4:
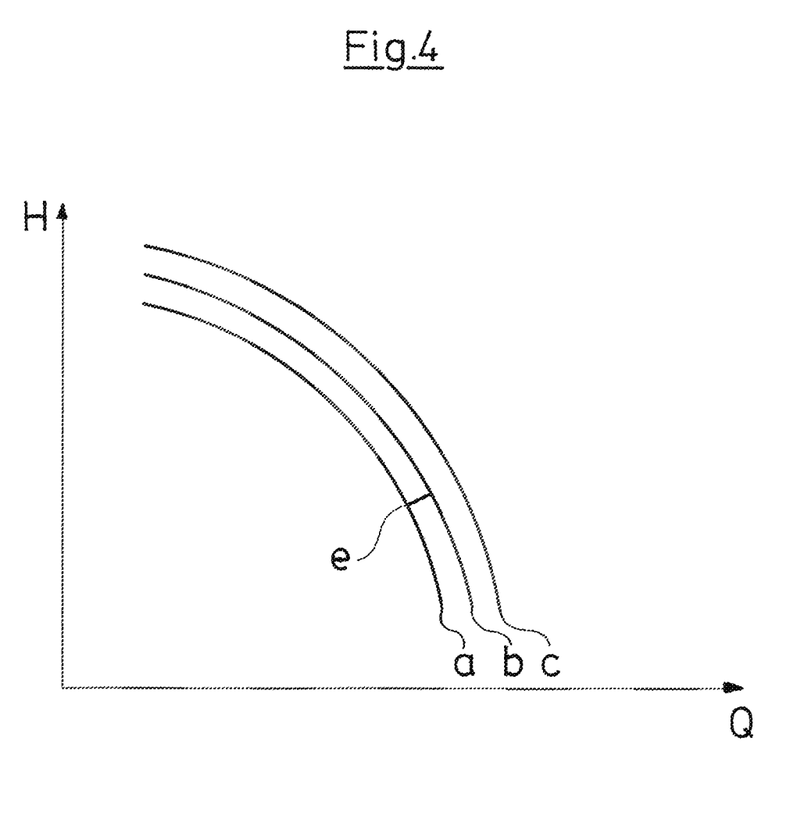
FIG. 4 is a diagram showing three pump curves of pump assemblies of the same type.

The principle of the method according to the invention is thus based on evaluating the data of a multitude of pump assemblies or pump assemblies groups, which for example are already in operation throughout the world and whose data is acquired in a cloud-based manner, such that the operation of individual pump assemblies or pump assembly groups can be improved by way of this, or, with renewed starting operation, a programming of the electronic motor control can be effected on the basis of comparable pump assemblies/pump assembly groups which are already running and are in operation. Thereby, the pump curves of a multitude of pump assemblies of the same type or pump assembly groups of the same type can be statistically evaluated, for example by way of evaluating the server-side data, in order to bring these pump assemblies and/or pump assembly groups as close as possible to the actual operating points. As is shown in FIG. 4, pump curves a, b and c result for three pumps of the same type, and these curves are distanced to one another and do not correspond to one another. A pump curve which results from the mean and which has been determined on the basis of a multitude of pump assemblies is stored in the programming of an individual pump assembly after the statistic evaluation of a multitude of such pump curves.

As has been described above, with pump assemblies of the same type, of which some are operated with a hydraulic sensor and some without a hydraulic sensor (pressure sensor or flow sensor), not only can the method according to the invention be used to render the model computation significantly more precise by way of comparing the operating points computed by model on the basis of the electrical values, with the sensorically determined operating points, but the pump curves forming the basis of the pump assemblies can be put on a significantly broader statistical footing than would be possible with the more complicated, but in comparison fewer laboratory measurements.

The flow rate through the pump, thus the temporal course of the delivery volume flow, in the case of pump assemblies without a sensor, is determined on the basis of the following equations:

$$\Delta p = a_{h2}q^2 + a_{h1}qn + a_{h0}n^2 \quad (1)$$

$$P = a_{t2}q^2n + a_{t1}qn^2 + q_{t0}n^3 + B_1n^2 + B_0n + P_0 \quad (2)$$

with

| | |
|---|---|
| $\Delta p$ | differential pressure between the pump inlet and the pump outlet or the pump group inlet and pump group outlet (booster pumps) |
| $P$ | electrical power |
| $q$ | flow rate through the pump |
| $n$ | speed of the pump |
| $a_{h2}, a_{h1}, a_{h0}$ | parameters of the mathematical model representing the pump pressure |
| $a_{t2}, a_{t1}, a_{t0}, B_1, B_0, P_0$ | parameters of the mathematical model representing the pump power |

The flow rate q can be computed from the equation (1) on account of the pressure difference $\Delta p$ of the pump or of the pump group and the speed n. It is possible to compute the flow rate q from the equation (2), from the pump power P and the pump speed n. These computations depend on the parameters $a_{h2}$ to $a_{h0}$ and $a_{r2}$ to $a_{r0}$. If the power P as well as the differential pressure Δp and the speed n are known, the flow rate q can be computed as follows $$q = \lambda_1 \frac{P}{n^2} + \lambda_2 \frac{\Delta p}{n} + \lambda_3 n + \lambda_4 + \lambda_5 \frac{1}{n} + \lambda_6 \frac{1}{n^2} \quad (3)$$

| | |
|---|---|
| $\lambda_1, \lambda_2, \lambda_3, \lambda_4, \lambda_5, \lambda_6$ | parameters of the model representing the flow rate, whilst using the aforementioned differential pressure models and power models |

The flow computation depends on the parameters $\lambda_1$ to $\lambda_6$, which are typically determined on the part of the manufacturer by way of tests. This work is time-consuming and expensive. For this reason, these parameters are mostly only available for a few pumps and are interpolated for others. As is shown in FIG. 4, which represents three pump curves a, b and c of three different pumps of the same type, these curves have a scatter e between the pump a and the pump b. Considering now pumps a and c, this scatter is even larger. If therefore only one pump, for example pump b is measured, then a significant scatter in the pump curves results even with pumps of the same type. In order to reduce such scatter, according to the invention, one envisages determining the parameters of the above equations on the basis of large data quantities as are available on the data base side at the server 8, of a large number of pump assemblies, on account of the multitude of pump assembles of the same type and by way of statistical evaluation, in a comparatively precise manner and specifically where possible, whilst using the data of pump assemblies, with which the differential pressure Δp and/or the volume flow q are determined by sensor. The equation (2) can be improved with this information, since the power and the speed of the pump are always available on account of the corresponding motor data, so that parameters which describe the average electrical/hydraulic behaviour of the pump assembly type concerned can be found. The parameters of the equations (1) and (3) can be determined if a flow sensor is also present additionally to the differential pressure sensor. The determining is effected by way of known mathematical methods, for example by way of linear regression. Thereby, a continuous updating of the parameters of the equation (1) is effected. The sought parameters are collected as parameter vectors and are updated with known methods, so that it is not necessary to compute these afresh each time from the complete data, when a parameter set is requested.

Since it is particularly with the wireless communication that a loss of data packets or files can occur, at all events one must examine whether the applied data set is consistent before a parameter updating. Thereby, the data set to be used is applied in the already available model and it is examined as to whether the value determined with this lies within the standard deviation of the applied model. The data set is not used for further determining the parameter if this is not the case. Thereby, it makes sense to not only use pump assemblies of the same type for determining the parameters, but where possible also those which are used in a comparable manner and which roughly have the same operating hours, in order to be able to compensate any occurrence of wearing.

The method according to the invention can also be used for example to determine the energetically most favourable switching points in the case of booster pumps with which a group 5 of pump assemblies 1a are operated in parallel and with which the pumps are connected and disconnected according to requirements, by way of the common electronic control 6. The connecting is thereby often effected according to simple rules, for example the next pump is connected when the already running pumps have reached 95% of their maximal speed. This is often not energetically favourable.

Figure 3:
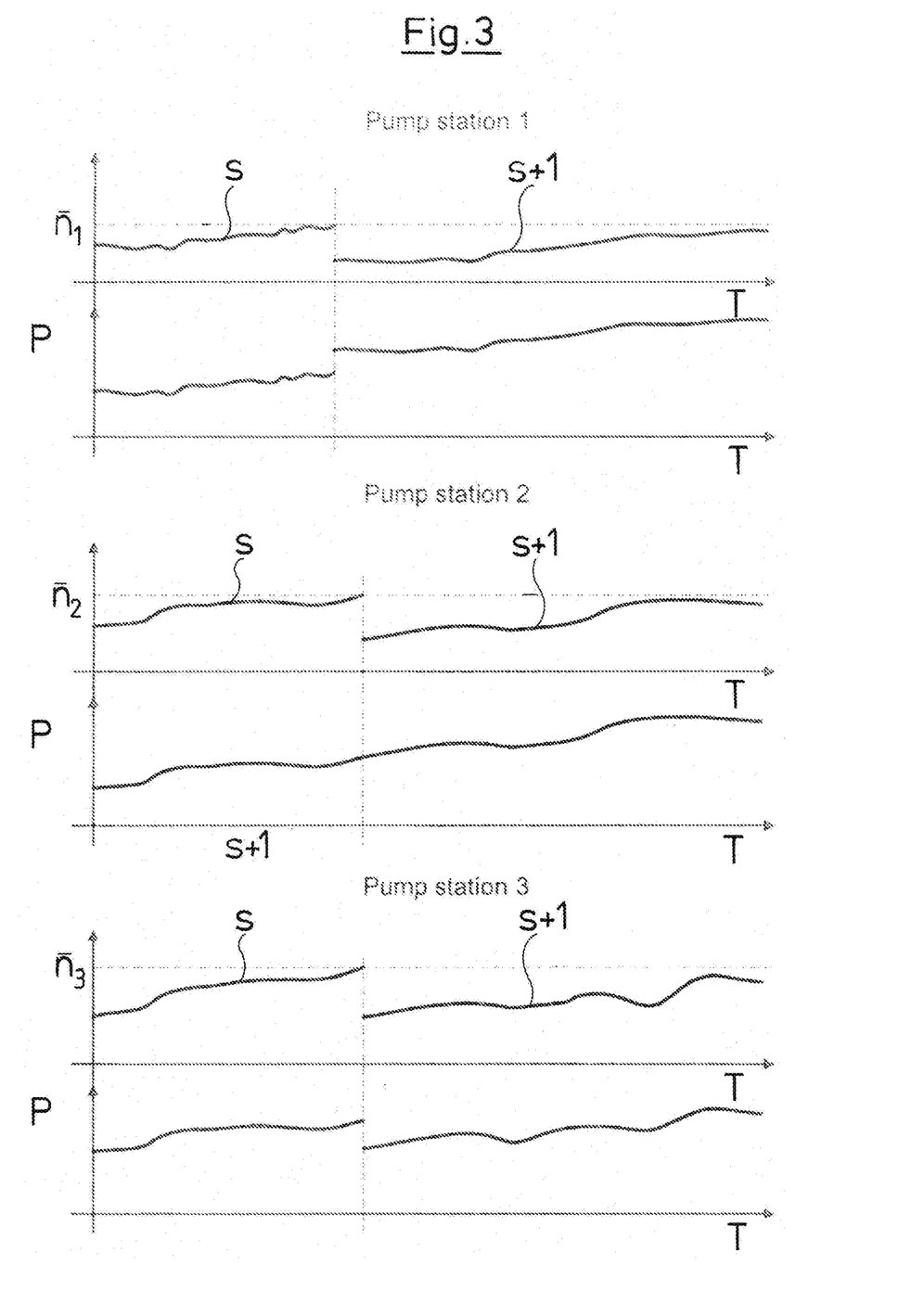
FIG. 3 is a diagram showing the power consumption of a pump assembly consisting of several pumps, at a different transition speed.

According to the invention, the data for example of three pump assembly groups is evaluated with regard to their temporal course, as is represented by way of FIG. 3. The three pump assembly groups have different switching speeds the pump assembly group 1 (pump station 1) has a switching speed $\bar{n}_1$ which is lower than the switching speed $\bar{n}_2$ of the pump assembly group 2 (pump station 2) which in turn is lower than the switching speed $\bar{n}_3$ of the pump assembly group 3 (pump station 3). If one now compares the power consumption P over time T, in dependence on the running pump speed s, then it becomes clear that the pump station 2 has the energetically most favourable switch-over speed $\bar{n}$. This switching threshold which is effected by way of evaluating operating data on account of the data base 8 can be effected in an automated manner and serve for adapting the switch-over speed of such pump stations, be it on installation or after a certain time. The switching speed $\bar{n}$ must always be determined afresh if the inlet pressure significantly changes, since these settings are dependent on the pressure conditions at the inlet of the booster pump. One then seeks comparable data of booster pumps in the data base, and the most favourable switch-over speed for the pump station is computed afresh on the basis of this comparison which is effected similarly as described by way of FIG. 3.

While specific embodiments of the invention have been shown and described in detail to illustrate the application of the principles of the invention, it will be understood that the invention may be embodied otherwise without departing from such principles.

APPENDIX

List of Reference Symbols 1, 1a pump assembly
2, 2a electric motor
3, 3a centrifugal pump
4, 4a electronic motor control
5 pump assembly group
6 electronic control of 5
7 data connection path
8 server
9 operating person
10 smart phone
15 to 19 method steps
s pump speed
$\bar{n}$ switching speed
e deviation (FIG. 4)

What is claimed is:
1. A method for operating at least one pump assembly of a multitude of pump assemblies, the method comprising the steps of:
providing the pump assemblies so as to each comprise a programmable electronic motor control for individual pumps or groups of pumps and which are at least temporarily data-connected to a server via a network;

transferring data comprising parameters and/or operating data of each of the multitude of pump assemblies via the network to the server and storing the transferred parameters and/or operating data in a data base associated with or comprised by the server;

processing the stored parameters and/or operating data according to defined computation rules; and adapting programming of the at least one pump assembly, via the network, based on the processed data, wherein, with a first group of pump assemblies, operating data is determined by way of electrical variables of a drive as well as by way of at least one detected hydraulic variable, and with which with a second group of pump assemblies of the same type, operating data is acquired by way of electrical variables of a drive, and on the server side, the operating data of the second group of pump assemblies is adapted in the programming on the basis of the detected hydraulic variables of the first group.

2. A method according to claim 1, wherein:
the multitude of pump assemblies include assemblies of different types; and
the step of transferring parameters and/or operating data includes acquiring data of the pump assemblies of different types in the data base and further comprising grouping data of the pump assemblies of different types for processing.

3. A method according to claim 2, wherein the operating data of pump assemblies of the same type is statistically evaluated, and the programming of at least one pump assembly is adapted based on a predefined deviation from the evaluated data.

4. A method according to claim 1, wherein the pump parameters are provided as pump curves of a multitude of pump assemblies or pump assembly groups and are statistically evaluated on the basis of the operating data, stored in the data base, of pump assemblies of the same type or of pump assembly groups of the same type, wherein the results of the statistical evaluation comprise mean data which is used for programming a pump assembly or a pump assembly group.

5. A method according to claim 1, wherein data of an operating condition of a pump assembly or of a pump assembly group is compared to data from the data base, of operating conditions which are the same with regard to the hydraulic situations, of pump assemblies or pump assembly groups, of the same type, wherein an in particular energetically more favorable operating condition is determined by the comparison, and the pump assembly or the pump assembly group is programmed for reaching the more favorable operating condition.

6. A method according to claim 5, with which, with a pump assembly group, switching points for connecting and disconnecting the pump assemblies of the group are programmed.

7. A method for programming a programmable, electromotorically driven pump assembly or a pump assembly group, the method comprising the steps of:
providing pump assemblies or pump assembly groups or both pump assemblies and pump assembly groups that are programmable electromotorically driven pump assemblies of the same type and in operation;

transferring parameters and/or operating data of each of the pump assemblies or each of the pump assembly groups or both each of the pump assemblies and each of the pump assembly groups to a cloud-based data base;

comparing parameters and/or operating data of the pump assembly or of the pump assembly group with data stored in the data base; and adapting programming of the pump assembly or of the pump assembly group based on a predefined deviation determined during the comparing step, wherein, with a first group of pump assemblies, the operating data is determined by way of electrical variables of a drive as well as by way of at least one detected hydraulic variable, and with which with a second group of pump assemblies of the same type, the operating data is acquired by way of electrical variables of a drive, and the operating data of the second group of pump assemblies is adapted in the programming on the basis of the detected hydraulic variables of the first group.

8. A fluid pump system comprising:
a multitude of pump assemblies having a programmable electronic motor control for individual or groups of the pump assemblies;
a server with a data base for storing parameters or operating data or both parameters and operating data of each of the pump assemblies;
a network;
a data connection at least temporarily data-connecting to the server via the network; and
a data processing device configured to evaluate data transferred from each of the pump assemblies, according to predefined rules, and to adapt programming of at least an individual pump assembly based on the evaluated data, wherein:
the multitude of pump assemblies comprises a first group of pump assemblies which is provided in each case with at least one sensor for detecting a hydraulic variable and the operating data is determined by way of electrical variables of the drive as well as by way of at least one detected hydraulic variable;
the multitude, of pump assemblies further comprises a second group of pump assemblies of the same type and the operating data is determined by way of electrical variables of the drive; and
at the server, the operating data of the second group of pump assemblies is adapted in the programming on the basis of the detected hydraulic data of the first group of pump assemblies.

9. A fluid pump system according to claim 8, wherein the evaluation is effected according to statistical rules.

10. A fluid pump system according to claim 9, wherein the network is internet based and the pump assemblies or pump assembly groups comprise a webserver or are connected to the internet via a LAN or WLAN.

11. A fluid pump system according to claim 8, wherein the network is internet based and the pump assemblies or pump assembly groups comprise a webserver or are connected to the internet via a LAN or WLAN.

* * * * *